H. L. DAVIS.
LOCK NUT.
APPLICATION FILED MAR. 31, 1921.

1,422,750. Patented July 11, 1922.

Inventor
H. L. Davis.

By Lacey & Lacey, Attorneys

UNITED STATES PATENT OFFICE.

HARMON L. DAVIS, OF GREENVILLE, PENNSYLVANIA.

LOCK NUT.

1,422,750.　　　　Specification of Letters Patent.　　Patented July 11, 1922.

Application filed March 31, 1921. Serial No. 457,415.

*To all whom it may concern:*

Be it known that I, HARMON L. DAVIS, a citizen of the United States, residing at Greenville, in the county of Mercer and State of Pennsylvania, have invented certain new and useful Improvements in Lock Nuts, of which the following is a specification.

This invention relates to improvements in lock nuts and has as one of its objects to provide a lock nut which may be employed in precisely the same manner as the ordinary nut and which when applied to its bolt will be securely locked thereon in any position to which it may be adjusted and which furthermore will not require the employment of a specially formed bolt.

Another object of the invention is to provide a lock nut in which the locking means is of such nature that it may be produced at a low cost and readily assembled with the nut and when once assembled will not be liable to become disarranged.

A further object of the invention is to provide a lock nut embodying a locking means which, while it is adapted to bind and lock the nut upon the bolt in any position to which the nut may be rotated, may be, when desired, rendered inactive so that the nut may be removed in the usual manner.

Figure 1:
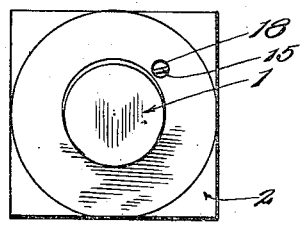
Figure 1 is a view in elevation of a lock nut constructed in accordance with the present invention and applied to a bolt which is shown in end elevation.
Figure 2:
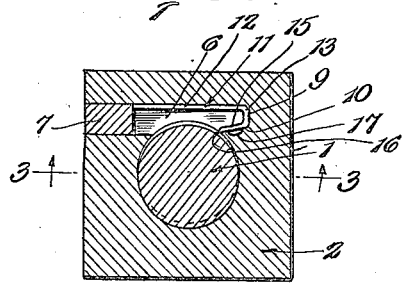
Figure 2 is a vertical transverse sectional view through the nut and bolt, the locking element of the nut being shown in elevation.
Figure 3:
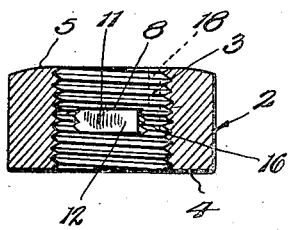
Figure 3 is a sectional view on the line 3—3 of Figure 2 looking in the direction indicated by the arrows, the bolt being omitted for the sake of clearness.
Figure 4:
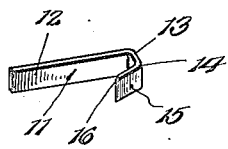
Figure 4 is a perspective view of the locking element removed from the nut.

In the drawings, the numeral 1 indicates any ordinary bolt and the numeral 2 indicates in general the lock nut which except for the locking device constituting the present invention, does not differ from an ordinary nut, being provided with the usual threaded opening 3 for the reception of the bolt 1. The binding face of the nut is indicated by the numeral 4 and its opposite or outer face is indicated by the numeral 5 and the nut is formed with a seating recess 6 which in the first instance opens through one of the side faces of the nut, this recess at one side likewise opening into the bolt opening 3, as best shown in Figures 2 and 3 of the drawings, and being therefore in a sense chordal or tangential to the bolt opening. As stated the recess 6 initially opens through one of the side faces of the nut but after the introduction of the locking element, to be presently described, this end of the recess is closed by any suitable plug or filling 7 so that when the nut is completed the recess 6 is closed on all sides except its side next adjacent the axis of the nut where, as stated above, it communicates with or opens into a bolt opening 3, this open side of the recess being indicated by the numeral 8. At its inner end the recess 6 is closed and preferably has its wall somewhat rounded, as indicated by the numeral 9, and thence extends along a straight line, as at 10, non-parallel to the outer side of the wall of the recess and diverging slightly therefrom in the direction of the open side 8 of the said recess, this portion 10 constituting a shoulder against which a portion of the locking element may rest as shown most clearly in Figure 2.

The locking element above referred to is indicated in general by the numeral 11 and the same is preferably formed from a leaf of spring metal and comprises a shank 12 which is straight throughout substantially its entire length, being however near one end bent approximately at right angles and along a slightly curved line, as at 13, and thence again bent as at 14 to provide a locking tooth 15 which is substantially flat and which, through the resiliency of the locking element, normally occupies a plane diverging with relation to the plane of the shank 12. The end edge of the tooth 15 is beveled, as indicated by the numeral 16, so that the edge is knife-like and is therefore adapted to bite into the threads of the bolt in the event there is any tendency for the nut to rotate or be rotated backwardly upon the bolt. By reference to Figures 2 and 3 of the drawings, it will be observed that the locking element 11 is assembled with the nut by being disposed within the recess 6 so that its shank 12 will rest against the flat outer wall of the recess and its bends 13 and 14 within the bend at the inner end wall 9 of the recess, the opposite extremity of the shank 12 being engaged by the inner end of the plug or filling 7. When the locking element is disposed in place the flat side of its tooth 15 will rest against the flat shoulder 10 in the manner shown in Figure 2, and the beveled knife edge of the tooth will project slightly through the adjacent end of the opening 8 and consequently a short distance into the bolt opening 3 so as to contact the threads of the bolt when the nut is threaded onto the bolt. In threading the nut onto the bolt, the knife edge of the tooth 15 being presented in a direction the opposite that in which the nut is rotated, this edge will ride freely over the threads of the bolt but should there be created any tendency for the nut to rotate backwardly upon the bolt, the said edge of the tooth 15 will immediately be brought into biting engagement with the threads of the bolt and the nut will be prevented from having such rotative movement.

It will be evident from the foregoing description that when the locking element is once assembled with the nut it cannot become accidentally disarranged and will at all times be effective to lock the nut against backward rotation from any position to which it has been rotated.

Figure 5:
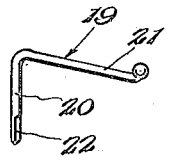
Figure 5 is a perspective view of a key which may be employed for the purpose of rendering the locking element inactive.

As it may become desirable to remove the nut after it has been applied to the bolt, means is provided whereby the locking tooth 15 may be rendered inactive and for this purpose the flat shoulder 10 of the recess 6 is formed with an approximately semi-circular notch 17 located at the inner end of a substantially cylindrical socket 18 which is formed in the nut parallel to the axis thereof and relatively close to the bolt opening 3 and which opens at its outer end through the face 5 of the said nut. For coaction with the tooth 15 there is provided a key such as shown in Figure 5 of the drawings and indicated by the numeral 19 and this key is provided with a shank 20 having a cranked portion 21 whereby it may be rotated by the hand after the shank has been inserted into the socket 18. The end portion of the shank at one side is flattened, as at 22, so that this end of the shank is adapted to seat within the notch 17 and between the wall of the notch and the flat side of the tooth 15, the said portion 22 being of segmental form in cross section. Having disposed the shank of the key within the socket 18 and with its end 22 seating within the notch 17 and behind the tooth 15, the key may be rotated so as to cause the rounded side of the said end 22 to ride against the flat face of the tooth 15 and thus spring the tooth in an inward direction to cause its knife edge 16 to recede from engagement with the threads of the bolt after which the nut may be threaded off from bolt in the usual manner.

Having thus described the invention, what is claimed as new is:

A lock nut comprising a body having a bolt opening and provided in one wall of the opening with a recess extending substantially tangential thereto, the recess opening through one face of the nut and terminating short of the opposite face thereof and being closed at the front and the back of the nut, one wall of the recess remote from the bolt opening being straight, the opposite wall of the recess for a portion of its length being located in a plane divergent to the plane of the first mentioned wall, a resilient locking element seated within the recess and comprising a shank resting against the first mentioned wall of the recess and provided near its end with a bend forming a locking tooth resiliently held against the second mentioned wall of the recess and with its engaging end projecting into the bolt opening whereby to engage and bite into the threads of the bolt upon which the nut is threaded, the last mentioned wall of the recess having a notch formed therein to receive a key for engagement with the tooth of the locking element for the purpose of springing the tooth to inactive position when the key is rotated, the front side of the nut being provided with an opening communicating with the recess and the said notch and adapted to receive the said key, and a plug closing the other end of the recess and engaging the adjacent end of the shank of the locking element.

In testimony whereof I affix my signature.

HARMON L. DAVIS. [L. S.]